(12) United States Patent
Voelker (10) Patent No.: US 6,370,112 B1
(45) Date of Patent: Apr. 9, 2002

(54) SEAMLESS PATH SWITCHOVER IN A CONNECTION-ORIENTED PACKET NETWORK

(75) Inventor: John Alvan Voelker, Aurora, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/098,151

(22) Filed: Jun. 16, 1998

(51) Int. Cl.[7] ................................................ H04J 3/14
(52) U.S. Cl. ....................... 370/218; 370/352; 370/373; 370/410; 370/418
(58) Field of Search ................................. 370/216, 217, 370/218, 227, 228, 352, 373, 410, 412, 413, 414, 415, 416, 417, 418

(56) References Cited

U.S. PATENT DOCUMENTS

| | | | | |
|---|---|---|---|---|
| 5,948,063 A | * | 9/1999 | Cooper et al. | 370/373 |
| 6,101,180 A | * | 8/2000 | Donahue et al. | 370/352 |
| 6,128,305 A | * | 10/2000 | Hjalmtysson et al. | 370/410 |
| 6,188,690 B1 | * | 2/2001 | Holden et al. | 370/418 |

* cited by examiner

Primary Examiner—Douglas Olms
Assistant Examiner—Shick Hom
(74) Attorney, Agent, or Firm—Werner Ulrich (57) ABSTRACT

In a connection-oriented packet switching network, different paths through the network from one point to another are likely to have different delay. The invention is a method and network architecture for rerouting data packets from one path to another path without loss, duplication, or mis-ordering of the packets (or cells) despite unpredictable differences in delay incurred by packets on the replacement path relative to packets on the original path. The invention uses a marker cell, which is either transmitted along one path or along both paths. At the downstream convergence of the original and replacement path, all pre-marker data packets arriving on the original path are first transmitted and then all post-marker data packets on the replacement path are transmitted. Proper use of the marker provides a means for ensuring that the data packets will be delivered in the proper order, despite the order in which the data packets are received over the original path and the replacement path.

10 Claims, 6 Drawing Sheets

FIG. 1
(PRIOR ART)

| | 8 | 7 | 6 | 5 | 4 | 3 | 2 | 1 | BYTE OCTET |
|---|---|---|---|---|---|---|---|---|---|
| | GFC (AT UNI), VPI (AT NNI) | | | | VPI | | | | 1 |
| | VPI | | | | VCI | | | | 2 |
| | VCI | | | | | | | | 3 |
| | VCI | | | | PAYLOAD TYPE (PT) | | | CLP | 4 |
| | HEADER ERROR CONTROL (HEC) | | | | | | | | 5 |

GFC=GENERIC FLOW CONTROL
VPI=VIRTUAL PATH IDENTIFIER
VCI=VIRTUAL CHANNEL IDENTIFIER
CLP=CELL LOSS PRIORITY

SEAMLESS PATH SWITCHOVER IN A CONNECTION-ORIENTED PACKET NETWORK

TECHNICAL FIELD

The present invention relates generally to packet communication systems and telecommunication networks. In particular, the present invention relates to rerouting or reorganizing the path of a connection within a connection-oriented packet network such as an asynchronous transfer mode (ATM) network or a frame relay network.

DESCRIPTION OF THE PRIOR ART

Modern digital communications often use packet switching connection oriented networks of which Asynchronous Transfer Mode (ATM) networks are an important example. In packet switching connection oriented networks, a user digital data stream is broken into discrete units (for example of 48 bytes each). Each such unit is transmitted in a packet (or cell in the case of ATM). Attached to the front of the user data portion of the packet is certain header information. This header information includes fields used by the switches of the packet switching network to identify the correct rule for switching the packet; that is, to move the packet from the particular links or transmission facility from which the packet enters the switch to the particular transmission facility upon which the packet will be transmitted out of the switch. In the context of an ATM network, the VPI (Virtual Path Identifier) and VCI (Virtual Channel Identifier) fields (sometimes only the VPI field is used) in the ATM cell header (see FIG. 1) provide this functionality. Before transmitting the packets out of the switch, the switch generally modifies these header field values to align with the control data that will be used by the adjacent downstream switch to further switch the packet or to align with the expectations of the recipient of the data. Since this invention relates to connection oriented networks, all packets belonging to the same data stream, for example, the same telephone voice call, same fax transmission, or same data file download, will all traverse the same path through the network. That is, all packets belonging to the same data steam or call will traverse the same set of switches, use the same links between adjacent pairs of those switches, and upon each such links, use the same header index values. In support of the connection over the path, each participating switch will have stored rules that tell it how to map a packet arriving on a particular facility to a particular out-going facility and how to translate the relevant header routing indices. These rules are determined and come to be stored in the switches along the path of the connection by means of either signaling messages or via provisioning management, or some combination of the two.

To make the explanation more specific, we will refer to ATM connections. Hence packets are referred to as cells and the header routing indices are referred to as the VPI/VCI values. The applicability of the invention to packet switched connection oriented networks other than ATM networks is straightforward.

In a connection oriented packet network such as an Asynchronous Transfer Mode (ATM), or frame relay network, a connection (e.g., an ATM Permanent Virtual Circuit) (PVC) may need be moved to a replacement path despite the fact that the existing path is operational. This invention provides a means for executing that move to a replacement path without the loss, duplication, or misordering of packets (cells). We first explain how the need to move a connection from a working path to a replacement path might arise. Next we explain how differences in cell delay along the original versus replacement path make it difficult to guarantee that the change in path does not cause lost, duplicate, or out-of-order cells.

It may happen that a network administrator wants to move a working connection from an existing path to a some other path, herein termed the replacement path. There could be many motivations for doing this. For example, the existing path may be undesirable because it involves excessively many links or uses congested links. (An example of how such a situation could arise is as follows: Assume the connection was initially created on path A. Due to link failure on path A, the connection needed to be moved, on an emergency basis, to a replacement path B. Given the emergency situation, the network could not expend the time to find an optimum path, and accepted a path B that may be excessively long, congested, or some other way inconsistent with the connection's quality of service expectations or proper allocation of network resources among connections. By and by, the failure that precipitated the emergency change in path from A to B is corrected. Then, the network administrator may wish to return the connection from the use of path B to A or to some third path that is superior to B. This change from the working path B to a replacement path generally need not be done on an emergency basis, but should be done "sooner or later" to improve the performance of the connection or reduce the network resources (e.g. number of links) allocated to the connection.) On the other hand, the motivation for moving a working connection to a new path may be simply to better balance the load on the network.

Solution

Applicant will first analyze the problem in order to derive the proposed solution.

In the context of moving a connection from one path (the existing path) to another path, (the replacement path) we refer to the switch at which the two paths diverge as the originating switch, and we refer to the switch at which the two paths again converge as the destination switch. This terminology assumes a focus upon one direction of cell flow. The methods we discuss for changing a connection's path are described in terms of only one direction of flow. However, the actual implementation would apply these methods to each direction of a bidirectional flow with the role of the "originating switch" and "destination switch" reversed. Note that the replacement and original path may share some common links (i.e. facilities), but over those links different header indexes (VPI/VCI for ATM) would be used to distinguish cells assigned the respective paths.

To understand why moving a connection from one path to another may result in lost, duplicated, or out-of-order cells, first note that the time it takes a cell to leave an ATM switch and travel along a path involving many ATM switches until it arrives at the destination ATM switch will depend upon the path taken between the originating and destination ATM switch. If we change the path taken (perhaps changing the set of intermediate ATM switches, perhaps only the links used between adjacent ATM switches, perhaps some combination of the two kinds of changes), the delay experienced by cells will generally change. Two elements contribute to this difference in delay. The first is propagation delay, the time cells spend traversing links, since the paths may differ in the number of links traversed and the length (and/or propagation speed) of those links. The second is buffering delay, the total time cells spend stored within (not between) the switches along the path. The paths may differ in buffering delay, which is a function of the cell flow of many connections besides the one of interest to us, encountered within the ATM switches involved in the connection. Even if the two paths use the same set of switches, different queues may be used in those switches for the different links used in the two paths. To further complicate the situation, we may not be able to definitively label one of the two paths as the faster of the two, since the delay in particular queues can change moment to moment. The delay experienced in a queue depends upon the characteristics of the several connections using that queue, and different queues serve different sets of connections with different traffic patterns. So the identity of the "faster path" may change from moment to moment if the variation in buffering cell delay is large relative to the difference in transmission delay between the two paths. Note that the invention described herein does not rely on any particular relationship between path length and delay; nor does it rely upon one path or the other consistently providing less delay.

When moving a connection from one working path to another, this differential delay between the original and the replacement path can damage the integrity of the cell stream as will be explained below. It is the purpose of this invention to prevent this damage. Observe what happens when the originating node stops sending cells on the original path and starts (with the next cell) sending cells on the replacement path. Some of the cells sent on the replacement path may arrive at the destination switch before some of the cells launched onto the original path arrive there. If the destination switch transmits cells it receives for the connection in the order it receives those cells, then the sequential order of the cell stream may be corrupted. (Note: we will say "transmits cells" as a short hand when referring to the destination switch placing the cells upon the output queue for the outgoing port or placing the cells in a shaping function for transmission on the outgoing port). On the other hand, if the destination switch follows the policy of discarding any cells received on the original path once it has received a cell on the replacement path, then any cells still in transit along the original path will be lost.

The integrity of the cell stream is also damaged when an alternative path switchover uses a cell replication technique. The originating switch replicates the cells of the connection and sends a copy of each cell on the original and replacement path. Then the destination switch, at some subsequent time, begins discarding cells arriving on the original path and transmitting cells arriving on the replacement path. But again, the differential delay along the two paths can cause difficulties. When the destination switch starts transmitting cells arriving from the replacement path, copies of some of those cells may already have been received on the original path and transmitted. This means duplicate copies of some cells are delivered to the destination. On the other hand, when the destination node starts using the replacement path as its source for cells to transmit, the replacement path copies of cells belonging after the last cell accepted from the original path may already have been received on the replacement path and discarded. Any such cells will be missing from the stream delivered to the output port.

The above has analyzed a problem of the prior art, namely that the differential delay with respect to original and replacement paths can result in out-of-order, duplicated, or missing cells in the cell stream delivered to the ultimate destination when a connection is moved from one path to another.

SUMMARY OF THE INVENTION

In accordance with this invention, a system and method is disclosed for rerouting or reorganizing the path of a connection within a connection oriented packet switching network, without incurring the loss, duplication or mis-ordering of data packets or cells when the path of a connection across a network is changed to a superior path (e.g. a path that is shorter, less congested, or whose use better balances network load.)

In one embodiment of the method, the originating switch replicates the cell stream so that one copy continues to follow the original path and the second copy follows the replacement path. Then, at some point upstream from where this replication is carried out, a special marker cell is created and inserted into the cell steam. As a result of these actions, two identical copies of the cell stream flow from the originating switch to the destination switch and the marker cell is identically positioned in the respective cell streams. The destination switch initially continues to transmit only cells arriving at it on the original path, but it commences to monitor the cells arriving on both the original and replacement path for the arrival of the marker. Data cells arriving on the original path prior to the marker arriving within that path, will be transmitted by the destination switch. Data cells arriving on the replacement path after the replacement path marker will, after a possible period of buffering, be transmitted from the destination switch. Temporary buffering will be needed for any cells arriving on the replacement path after the replacement path marker but before the arrival of the original path marker. These cells are transmitted upon the arrival of the original path marker.

The second embodiment of the invention does not involve replication of the cell stream. Instead, the originating switch diverts the cell stream from the original path to the replacement path after sending some arbitrarily selected last customer data cell along the original path. All subsequent data cells are sent along the replacement path. However, a special marker cell is created at the originating switch and sent along the original path to follow the last customer data cell using the original path. A marker cell may optionally be sent along the replacement path preceding the first data cell to be sent on that path. The behavior of the destination switch is similar to the case above, except that if a marker is not used on the replacement path, the destination switch acts as if such a marker had arrived before the first arriving data cell on that path.

Both embodiments of the invention require some message communication between the originating and destination switch to coordinate their actions. The marker cell can be a cell specially created for this purpose which would not be transmitted from the destination switch. Alternatively, the marker cell can be a data cell with its header somehow marked to indicate its purpose and which would be transmitted by the destination switch—perhaps after removing the distinctive modification to its header.

These procedures guarantee that the data stream can be transferred from the original to the replacement network path without any loss, duplication, or mis-ordering of the data cells despite differences in the delay experienced by cells along the respective paths.

A rerouting or reorganizing of a connection could be initiated by either a network administrator or by automated network administration. The method applies to both uni-directional or bi-directional connections, but for simplicity only the uni-directional is described. The bi-directional case basically involves using the uni-directional method for each of the two directions of flow. Two primary embodiments of the method will be discussed.

With respect to the direction of data flow considered, the switch where the two paths diverge is herein termed the origination switch and the switch where the two path again converge is herein termed the destination switch. (For the reverse direction of data flow, the roles of these two switches is essentially reversed). Special actions need to be taken at both the origination and the destination switches in a coordinated way to execute the seamless changeover.

BRIEF DESCRIPTION OF THE DRAWINGS

Features of this invention will be understood best from the following detailed description taken in conjunction with the drawings.

DETAILED DESCRIPTION OF THE PREFERRED EMBODIMENT

The invention described herein utilizes a marker inserted into a data packet stream to synchronize a switchover of a connection from an original path to a replacement path in any connection-oriented packet switching network. In a preferred embodiment, the invention is used in conjunction with an ATM network and corresponding permanent virtual circuit (PVC) connections. However, those skilled in the art will recognize that the present invention can be used in conjunction with any connection-oriented packet switching network in addition to ATM networks. And for ATM networks, the invention applies to connections other that PVCS. To reduce notational clutter, the ATM PVC connection will be assumed to be based only on VPI values, and not on the combination of VPI and VCI values. That is, the switching of ATM cells is a function only of link identity and VPI header value index; the VCI value is ignored and transparently passed through the ATM switches. The application of the present invention to channel level connections using the VCI value is trivial.

The term "cell" or "ATM cell" refers to a specialized kind of packet specified for use in ATM networks. The term "link" will refer to a transmission facility connecting two switches or connecting a switch to equipment on the other side of the network boundary. In the later case, the term "end-point link" also applies. The term "connection" will refer to the functionality of transporting packets or cells between two end-point links with the cells having a characteristic VPI value (or VPI and VCI value in the case of channel connections) on each respective end-point link. A connection uses a path through the network. The term "path" refers to the set of links and associated VPI values, pair wise connected by switches, that includes the two end-point links that define the connection, and that serve to carry cells through the network between the end-point links. Normally, a connection uses only one path. However, this invention involves the case of a connection being moved from one path to another path.

Figure 1:
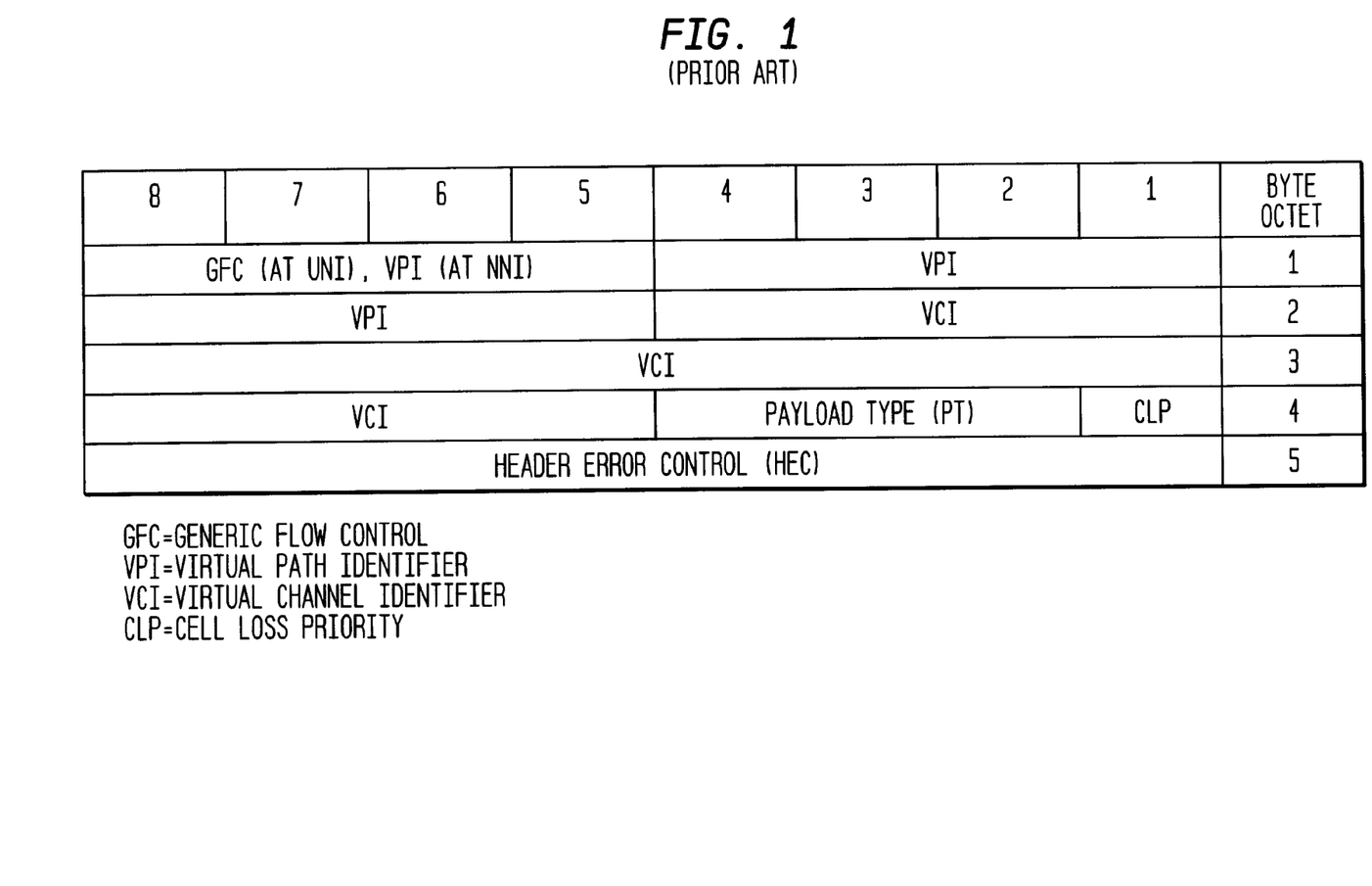
FIG. 1 is a chart showing the structure of an ATM cell header block.

FIG. 1 show the header of an ATM cell. An ATM cell is a packet. The VPI field (or the VPI and VCI fields) in the header of ATM cells serve to associate cells carried on a particular link with a particular connection.

The eight columns of FIG. 1 represent the 8 bits of each of the five bytes (Octets). Bit 8 represents the most significant bit, and bit 1, the least significant bit. Bits 8-5 of the first Octet represent the generic flow control when they are part of the User to Network Interface (UNI) or the first four bits of the virtual path identifier when they are within the Network to Network Interface (NNI). The last four bits of Octet 1, and the first four bits of Octet 2 represent a virtual path identifier (at UNI), and the last 8 bits of a virtual path identifier at NNI. The last four bits of the second Octet, the full third Octet, and the first four bits of the fourth Octet represent the virtual channel identifier. The bits 4-2 of byte 4 represent the payload type which discriminates between user cells and other types of cells, while the last bit of Octet 4 represents the cell loss priority which indicates the eligibility of a cell for discard under conditions of congestion. Finally, the fifth Octet is dedicated to header error control (HEC) and is used to check for the integrity of the header.

Figure 2:
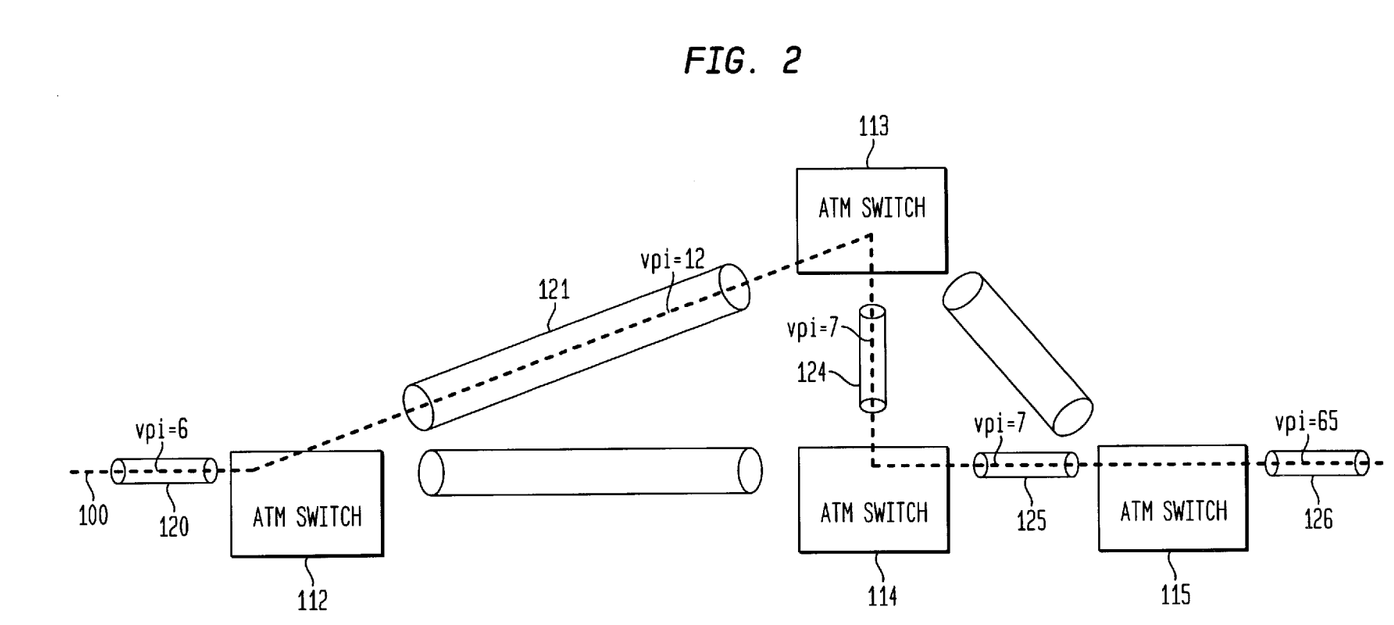
FIG. 2 is a block diagram of a simplified ATM network with switches and links, showing a connection using its original path—the starting point for operation of the invention.

FIG. 2 shows a simplified ATM network supporting a connection along a path. The connection 100, in general, will carry cells in both directions along the path indicated. Cells enter ATM switch 112 from link 120, are transmitted from this switch onto link 121, enter switch 113 where they are transmitted onto link 124, enter switch 114 from where they are transmitted onto link 125, enter switch 115 from where they are transmitted onto link 126. Links 120 and 126 cross the boundaries of the network. The source or the destination of the cells on these links is not material—either could be another ATM switch, equipment to convert ATM cells to another format, or end user equipment. FIG. 2 also shows example VPI header values (as mentioned above, for simplicity, we ignore VCI values in this discussion), that identify connection 100 along each link of the path. For example, the cells enter switch 112 on link 120 with VPI=6. Switch 112, in accordance with table values stored in its memory, changes these header fields to VPI=12 before transmitting them onto link 121. FIG. 2 shows the VPI values used by the connection on each link of the connection's path. Cells with different VPI values may share the use of link 120, but those cells do not belong to connection 100. Cells also flow in the reverse direction for the connection, entering ATM switch 115 on link 126 with VPI=65 and use the path described above until they are transmitted from switch 112 onto link 120 with VPI=6. The connection or PVC can be viewed as the bi-directional transfer by the network of cells between, on the one hand, link 120 upon which the cells have VPI=6 and, on the other hand, link 126 upon which the cells have VPI=65. These end-point characteristics (which link, which VPI) are used by the external entity (e.g. a customer or another network) on whose behalf the connection is established. So these end-point values can not be changed while claiming to support the same connection.

Figure 3:
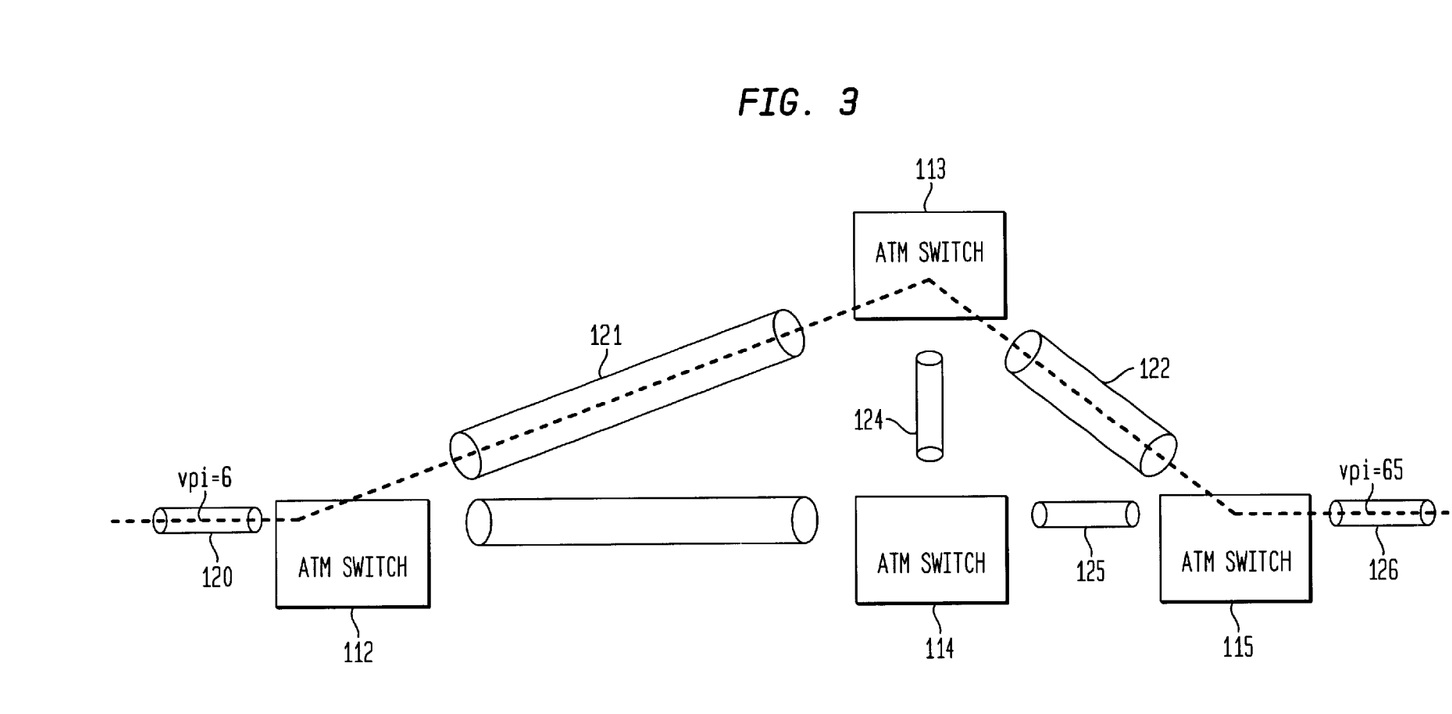
FIG. 3 is a block diagram of a the same ATM network, showing a connection using its replacement path—the ending point for the operation of the invention.

FIG. 3 shows a replacement path for the connection 100 shown in FIG. 2. Note that the end-points of the connection; namely, link 120 with VPI=6 and link 126 with VPI=65, are the same in FIG. 3 and FIG. 2. These end-points are customer interfaces and may not be changed even when the path is changed. However, between these end-points, there are differences in the paths illustrated in FIG. 2 compared with FIG. 3. Switch 112 still transmits cells received on its end-point onto link 121 where they are received by switch 113. However, switch 113 transfers those cells onto link 122, instead of onto link 124 as is done per the original path illustrated in FIG. 2. Link 122 on the replacement path carries the cells to switch 115 which transmits them onto the connection's other unchanged end-point link 126 with VPI= 65. Note that the replacement connection illustrated here involves fewer links that the original connection illustrated in FIG. 2, a fact that may motivate the transfer of the connection to the replacement path, but not a fact in any way essential to the present invention.

Before the procedure begins, the replacement path (e.g., FIG. 3) must be determined. There are many ways this can be done, but it suffices to say that the process may be very similar to acquiring the original path. It may involve the automated discovery of the replacement path by the switches, or the identity of the replacement path may be predetermined, perhaps specified by the network administrator. Acquiring the resources to support the replacement path involves reserving bandwidth for the connection along all links of the replacement path, and selecting VPI index values for use by the connection for each link of the replacement path.

Also, before the process of transferring the connection from the original path (FIG. 2) to the replacement path (FIG. 3) can begin, a pair of switches that are involved in both the original and replacement path must be selected to play the role of what we herein term the originating switch and the destination switch. These roles are actually defined with respect to a direction of cell flow. If the connection is bi-directional, the role of origination and destination switch is essentially reversed for the reverse direction of cell flow. The origination switch and termination switch will also herein be termed pivot switches. It will always suffice to select these two switches to be the switches that serve the end-points of the connection. However, as explained below, it is sometimes possible to select other switches for these roles.

Figure 4:
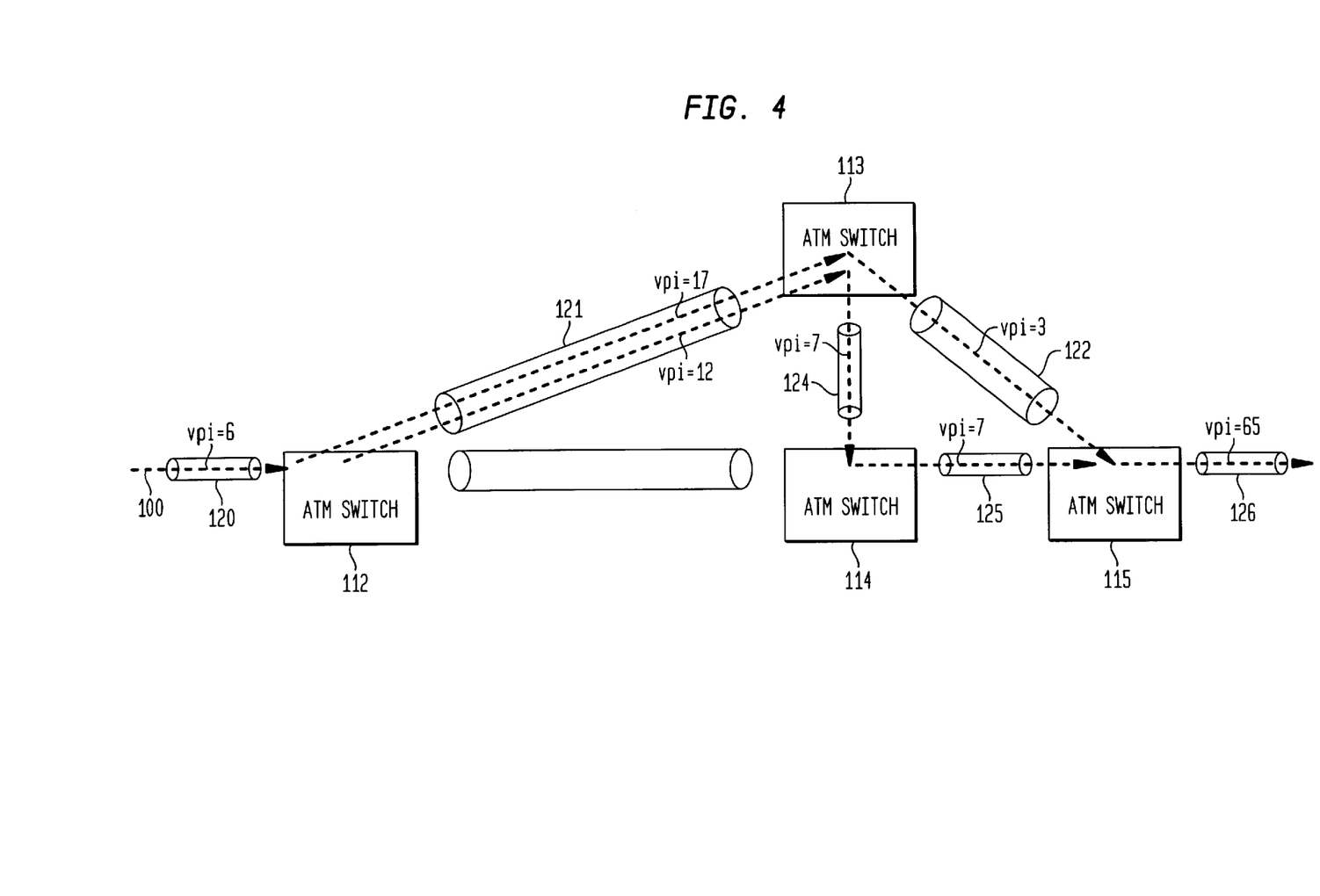
FIG. 4 is a block diagram of a the same ATM network, showing concurrent usage of the original and replacement path by a connection—an intermediate stage in the operation of the invention.

In FIG. 2 and FIG. 3, switches 112 and 115 can play the role of origination switch and destination switch for the process of changing the path used by connection 100. However, since both the original path (FIG. 2) and the replacement path (FIG. 3) share the use of link 121, it is possible to use switch 113 in place of switch 112 as an origination/destination switch. The key idea is that the two switches that play these roles must bracket the differences in links used between the two paths. In other words, the original and replacement paths must use the same links outside the region of the network bracketed by these two switches. Once these two switches have been selected, resources for two cell flows (temporary provision for duplicate copies of the cell stream of the connection for which we are changing the path) must be acquired on any links common to the original and replacement path between these two switches. In particular, separate VPI values must be selected and additional bandwidth must be reserved. In FIG. 2 and FIG. 3, link 121 is shared between the two paths. So if switch 112, instead of switch 113, is selected for the origination/destination role, then duplicate VPI and bandwidth must be assigned on the link 121. FIG. 4 shows VPI=17 assigned on common link 121 to support the replacement path. This "double" use of resources on common links bracketed by the pivot switches need be maintained only for the brief period of time during which the path migration process is carried out.

The following steps define how the connection is moved from the original path to the replacement path. The focus is upon one direction of flow, an example of which is provided by FIG. 4 as the flow from the switch 112 to the switch 115. For this direction of flow, switch 112 is assigned the role of origination switch and switch 115 is assigned the role of destination switch. (These steps will make reference to FIG. 4, but their applicability is general.) With regards to using messages to coordinate the functions of the pivot switches, the origination switch for one particular direction of flow will, in the preferred embodiment, take a lead role. The detailed description below refers to the direction of flow (from switch 112 to switch 115) for which the origination switch 112 takes the lead role in this message exchange.

Note that references to the destination switch transmitting cells refers to causing those cells to be delivered to a switch functionality in such a way that they will be ultimately transmitted (e.g. onto link 126 with VPI=65) in the order in which they were delivered to that functionality. That functionality might be a "shaping function" to smooth the outgoing cell flow, or it might simply be queuing for the outgoing port:

1. Activate the replacement path at all switches involved in the replacement path between, but not including, the origination switch 112 and destination switch 115. For example, switch 113 is caused to transfer cells between link 121 and link 122 where the cells taken from and placed onto link 121 have VPI=17 and the cells taken from and placed onto link 122 have VPI=3.
2. The originating switch 112 sends what is herein termed the path-switchover message to the destination switch 115 informing it that the path of a particular connection 100 (perhaps described in terms of link 125, VPI=7) is to be changed, identifying the port or link (link 122 in FIG. 4) corresponding to the replacement path, and the VPI (VPI=3 in our example) used by the replacement path at that port. Optionally, this message could be part of the signaling involved in reserving network resources and closing interior connections (i.e., at tandem switches) for the replacement path.
3. The destination switch sends an acknowledgment message to the originating switch referencing the particular path-switchover message and begins monitoring cells arriving on both the original and replacement path for the arrival of marker cells which are explained below. The destination switch continues to transmit on behalf of the connection only cells arriving on the original path.
4. Upon receiving the acknowledgment message, the originating switch begins to replicate each cell of the connection. (What is replicated is primarily the customer data, 48 bytes in the case of ATM, portion of the cell—much as is done for a point-to-multi-point connection. Certain other header field information is also replicated, but obviously not VPI values.) For each cell, one of the two replicates is sent out on the original path, and the other replicate is sent out along the replacement path.
5. Upstream of the point of replication, the originating switch inserts a specially marked cell (perhaps an operations and maintenance cell) into the stream with the VPI set identically to the other cells of the connection at that upstream point. This special marker cell will then be replicated along with the other cells in the connection, and one copy sent along each path. As a variation, instead of inserting a special cell which is not part of the customer data, the system can specially mark the header of a regular data cell of that connection upstream of the point of replication. The key is for the marker to have the same location relative to (other) data packets in the replacement path stream as it has in the original path stream. Provided that this relative position constraint is satisfied it is also conceivable that the marker be inserted separately into each cell stream downstream of the point of cell replication but still upstream of any element along either path that could cause differential delay between the paths.

6. At the destination switch, if the marker cell arrives on the original path and has not yet arrived on the replacement path, then upon the arrival of that original path marker stop transmitting cells arriving on the original path. That is, do not transmit any cells from the original path that arrive after the original path marker cell. (If the marker is a data cell, it is transmitted—probably after removing the change to its header that distinguishes it as a marker cell). When the marker subsequently arrives on the replacement path, transmit all cells arriving on the replacement path after that marker. Begin the tear-down of the original path as described below.

7. At the destination switch, if the marker cell arrives on the replacement path and has not yet arrived on the original path, then upon the arrival of that replacement path marker begin to buffer (store in sequence of arrival) all cells arriving on the replacement path after the replacement path marker. When the marker subsequently arrives on the original path, cease transmitting any cells arriving on the original path after that original path marker. (If the marker is a data cell, it is transmitted.) Then transmit those buffered cells that had already arrived on the replacement path; they are to be transmitted in the order in which they had arrived at the destination switch. Next transmit all newly arriving cells from the replacement path that arrive after the last cell buffered from that path. Begin the tear down of the original path as described below.

The tear-down of the original path can use a message from the destination switch to the origination switch. This message can travel back along the original path, and induce the release of original path resources and supporting switch table entries as it traverses the switches supporting the original path. When the message arrives at the originating switch, it will signal that switch to stop cell replication for the connection, stop sending cells out along the original path, and continue henceforth to send the cells for the connection out only on the replacement path.

Figure 5:
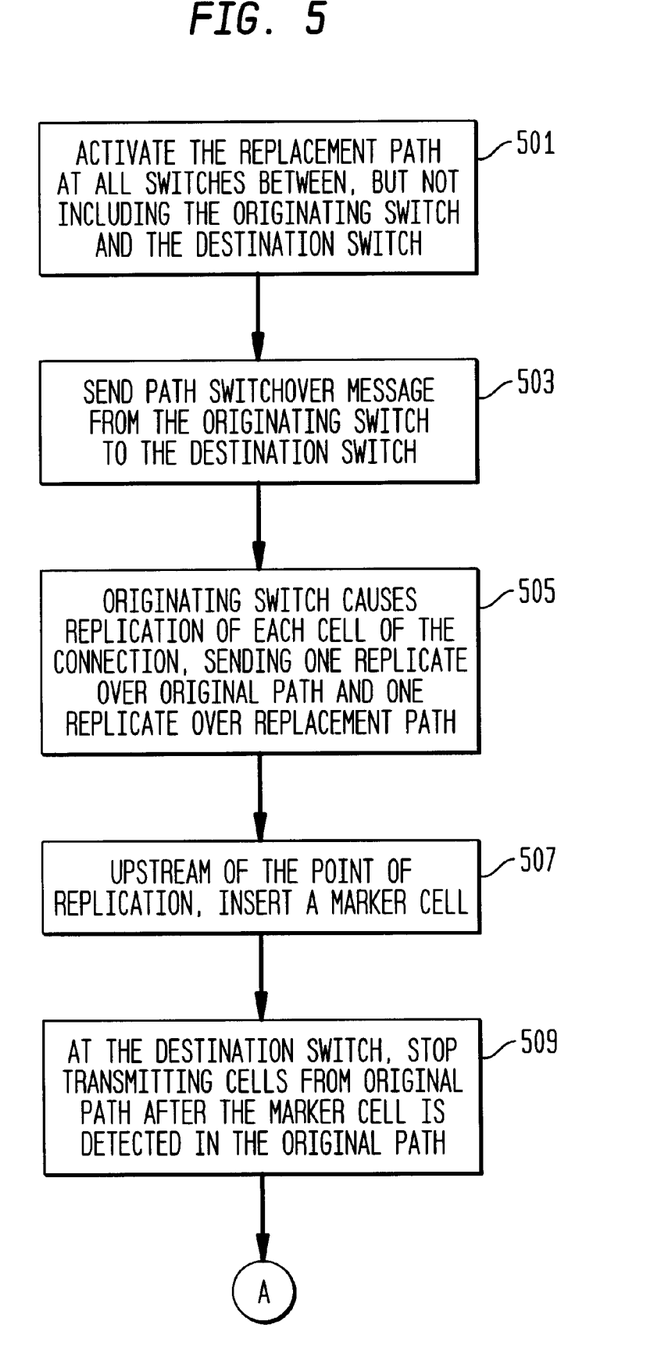
FIG. 5 is a diagram of the steps of the invention.

FIG. 5 illustrates these steps: first, the replacement path is activated at all switches between, but not including the originating switch (112) and destination switch (115), Action Block 501). A path switch-over message is sent from the originating switch to the destination switch, Action Block (503). The originating switch starts replicating each cell of the connection, sending one replicate over the original path and one replicate over the replacement path, Action Block (505). Upstream of the point of replicating, a marker cell is inserted in both paths, Action Block (507). At the destination switch, stop transmitting cells from the original path after the marker cell is detected in the original path, Action Block (509). At the destination switch, transmit eligible cells (defined below) from the replacement path only after the marker cell arrives on the original path. Eligible cells arriving before then are buffered and are the first to be transmitted when transmission is permitted, (i.e., after marker cell arrives on original path). Eligible cells are defined to be those that arrive on the replacement path after the marker cell arrives on the replacement path.

The following is another embodiment:

1. As described for the first embodiment above, activate the replacement path at all switches involved in that path except at the origination and destination switches.
2. As described for the first embodiment above, the originating switch sends a path-switchover message to the destination switch.
3. As described for the first embodiment above, the destination switch sends an acknowledgment message to the originating switch and begins monitoring cells arriving on both the original and replacement path, and continues to transmit only the cells arriving on the original path.
4. Upon receiving the acknowledgment message, the originating switch stops sending data cells along the original path and begins sending them on the replacement path. That is, some arbitrarily selected cell becomes the last data cell to be sent over the original path, and all subsequent data cell are sent along the replacement path. The last cell the originating switch transmits on the original path is a marker cell, either a specially inserted non-data cell or the above mentioned arbitrarily selected last data cell specially marked to be recognized by the destination switch as a marker. The arrival of this marker at the destination switch will indicate that no more data cells for the connections will be arriving on the original path.
5. At the destination switch, if the marker cell arrives on the original path before any cells have arrived on the replacement path, no more data cells for the connection should arrive on the original path. If the marker is itself a data cell, it is transmitted—probably after removing the change to its header that distinguishes it as a marker cell. When cells subsequently begin to arrive on the replacement path, transmit them. Begin the tear-down of the original path as described below.
6. At the destination switch 115, if cells arrives on the replacement path (i.e. arriving on link 122 with VPI=3) before the marker cell arrives on the original path (link 125 VPI=7), begin to buffer (store in sequence of arrival in a special buffer distinct from that used for transmitting onto the output port) all cells arriving on the replacement path while continuing to transmit cells arriving on the original path. When the marker cell subsequently arrives on the original path, cease transmitting any cells arriving on the original path after that marker cell (no such cells should arrive) and transmit the marker cell itself if and only if it is a data cell. Then transmit the cells that had already arrived on the replacement path and had been buffered These buffered cells are transmitted in the order in which they had arrived at the destination switch. Lastly, transmit all cells newly arriving on the replacement path; i.e., cell arriving after the arrival of the last cell from that path that had been buffered. Begin the tear down the original path as described below.

The tear-down of the original path can use a message from the destination switch to the origination switch. This message can travel back along the original path, and induce the release of original path resources and supporting switch table entries as it traverses the switches supporting the original path.

Additional embodiments are here briefly described in relation to the first embodiment above that used cell replication in the originating switch. The variation in behavior in comparison to the first embodiment is mainly confined, to the behavior of the originating switch. In the first such additional embodiment, cells ahead of the marker in the replacement cell stream are not transmitted from the originating switch or replication would be effectively deferred so that the marker or, alternatively, the cell belonging after where the marker would be, would be the first cell to travel on the replacement path. In the second additional embodiment, cells behind the marker in the original cell stream are not transmitted from the originating switch so that replication ceases for cells behind the marker; all such cells simply follow the replacement path.

The descriptions of the invention, as detailed above, referenced only the treatment for one direction of flow. For the other direction of flow, the roles of the origination switch and the destination switch are essentially reversed. However, there is some asymmetry with respect to message coordination between the pivot switches, as explained below. The selection of the replacement path and the acquisition of related resources is done only once and serves to support both directions of flow.

It is not necessary to duplicate all message traffic to coordinate the actions of the origination and destination switch for the reverse flow. The path-switchover message and its acknowledgment, as used in the forward direction, will provide sufficient information to the pivot switches 112 and 115 to permit them to coordinate the path switchover for the reverse direction of cell flow without additional messages. For example, in FIG. 4, after switch 112 sends its path-switchover message to switch 115, switch 112 can, in its capacity as a destination switch for the reverse direction of flow, commence monitoring incoming reverse flow cells from both the original and replacement path (that is, monitor cells incoming on link 121 with VPI=12 and cells with VPI=17 also incoming on link 121), and play the role of destination switch for those arriving cells. And when switch 115 receives the path-switchover message, it would commence acting like an originating switch for the flow that it sends toward switch 112 (i.e. inserting markers, etc.). Switch 115 would not need to send a path-switchover message to switch 112.

If removal of the original path must be done at the same time for both directions of flow, then the removal of the original path can only happen after the path switchover has completed for both directions of flow. This may mean, for example, that the messages alluded to above that indicate that the destination switch for a direction of flow has completed the switchover for that direction, must be received on behalf of each direction of flow (i.e., from each pivot switch) at each switch controlling resources for the original path before said resource controlling switch releases said resources for the original path.

In the embodiments described above, the transmission of data across a provisioned path can be moved to another path in any connection-oriented packet switching network in real time without the loss, duplication or mis-ordering of packets while users of the network are in the process of transmitting data across the network. The present invention gives the network administrator the ability to restructure the existing connections on the network at any time to improve the utilization of network resources or increase the performance of a given connection.

An Example

The invention may be better understood if described using a hypothetical ATM cell stream and hypothetical time periods in a hypothetical network. The following diagram illustrates the cell stream as it enters the network. The objective of the invention is that this diagram would also represent the cell steam as it leaves the network despite the fact that the path used by the connection 100 is changed as we transmit this data across the network. Each box represents an individual ATM cell carrying data.

| Cell 6 | Cell 5 | Cell 4 | Cell 3 | Cell 2 | Cell 1 |

The particular embodiment using replication at the originating switch is assumed in this example. At the originating switch 112, cell 1 enters the network before cell 2, etc. There, after the origination switch receives the acknowledgment message (relating to the change of connection path) from the destination switch 115, the cell stream is replicated so that one copy of the cell stream is sent along the original path (i.e. leaves switch 112 on link 121 with VPI=12) and the other copy is sent out on the replacement path (i.e. leaves switch 112 on link 121 with VPI=17). At some point in time after this replication is put into place, a marker is inserted into the cell stream at a point upstream of the point of replication. In this example, the marker is placed after cell 3 but before cell 4 as shown in the following diagram:

| Cell 6 | Cell 5 | Cell 4 | Marker | Cell 3 | Cell 2 | Cell 1 |

The cell that is labeled cell 1 should be thought of, not as the first cell in the connection, but as an arbitrary cell in a connection that arrives at switch 112 late enough to be replicated but early enough to precede the marker cell. What distinguishes cell 1, cell 2, . . . , cell 6 from the possibly thousands of other cells earlier and later in the cell stream is their position in the cell stream so as to play a central role in the path switchover operation.

The marker cell must be located in the identical location within the cell stream in both the original ATM cell stream that is sent over the original path and the copy ATM cell stream that is sent over the replacement path. This condition, critical for the invention to function as intended, can be guaranteed if the marker is inserted into the cell stream upstream from the point of replication.

Using the arbitrary packet or cell stream above, Table I illustrates an example of when cells would arrive at the destination switch 115 (FIG. 4) along both the original and replacement path, and how the destination switch would handle those cells according the teachings of the present invention. Since cells are arriving at the destination switch on two different ports corresponding to the two paths (e.g. in FIG. 4, original path enters switch 115 on link 125 with VPI=7 and replacement path enters on link 122 with VPI=3), the table distinguishes corresponding equivalent cells by using an apostrophe to mark the cells arriving on the replacement path. That is, cell 1 and cell 1' are both copies (except for VPI and possibly other header information) of the cell 1 that arrived at the origination switch as illustrated above, but arrive at the destination switch on the original and replacement paths respectively.

ATM cells do not contain sequence numbers, so that, for example, the destination switch can not tell which of cells 1 or 2' belongs ahead of the other. (However, cells arriving on one path before the marker on that path can be inferred to belong before cells arriving on the other path after the marker on that other path—this is the point of using the marker. Within a path, of course, the cells arrive in correct order since we assume a connection oriented network.). The position of the marker cell in the respective cell streams provides the information necessary for the destination switch to coordinate the hand-over from the original path to the replacement path.

TABLE 1

Example: Destination Switch View of the Connection

| Time | Arrival of cells on original path | Arrival of cells on replacement path | Placement of cell into buffer | Transmission of cells from destination switch |
|---|---|---|---|---|
| 1 | Cell 1 | | | Cell 1 |
| 2 | | Cell 1' | | |
| 3 | Cell 2 | Cell 2' | | Cell 2 |
| 4 | | Cell 3' | | |
| 5 | | Marker' | | |
| 6 | Cell 3 | Cell 4' | Cell 4' | Cell 3 |
| 7 | | Cell 5' | Cell 5' | |
| 8 | | | | |
| 9 | Marker | | | Cell 4' then 5' |
| 10 | Cell 4 | | | |
| 11 | | Cell 6' | | Cell 6' |
| 12 | Cell 5 | | | |
| 13 | Cell 6 | | | |

Events and actions at the destination switch as illustrated in Table 1 are explained as follows:

At time 1, cell 1 arrives on the original path. It is transmitted because the marker has not yet arrived on the original path.

At time 2, cell 1' arrives on the destination path. It is discarded because the marker has not yet arrived on the replacement path.

At time 3, cell 2 and cell 2' arrive. Cell 1 is transmitted and cell 2' is discarded since neither marker has arrived.

At time 4, cell 3' arrives on the replacement path. It is discarded since the marker has not yet arrived on the replacement path.

At time 5, the marker arrives on the replacement path. All subsequent cells arriving on the replacement path will ultimately be transmitted, although some may be buffered for a time before they are transmitted.

At time 6, cell 3 arrives on the original path and cell 4' arrives on the replacement path. Cell 3 is transmitted since the marker has not yet arrived on the original path. Cell 5' is buffer ed since the marker has not yet arrived on the original path but has arrived on the replacement path.

At time 7, cell 5' arrives on the replacement path and is buffered (in a manner that records the fact that it arrived after cell 4' which was previously buffered) because the marker has not yet arrived on the original path but has arrived on the replacement path.

At time 9, the marker arrives on the original path. All cells that subsequently arrive on the original path will be discarded. The replacement path cells that had been buffered (cell 4' and cell 5') are transmitted in the order in which they had been received and buffered. That is, cell 4' is transmitted; then cell 5' is transmitted.

At time 10, cell 4 arrives on the original path after the arrival of the marker on the original path. It is discarded.

At time 11, cell 6' arrives on the replacement path after the marker has arrived on both the original and on the replacement path. It is transmitted.

At time 12, cell 5 arrives on the original path after the arrival of the marker on the original path. It is discarded.

At time 13, cell 6 arrives on the original path after the arrival of the marker on the original path. It is discarded.

Note that the transmitted cell stream faithfully replicates the cell stream that entered the network for this connection. No cells have been lost, none have been duplicated, and they are transmitted in the correct order. This is accomplished despite the different delays experienced by cells as they traverse the original path as compared to delays experienced by the corresponding cells along the replacement path. (For this example, for cell 1 the original path is faster; and for cell 3, cell 4, cell 5, and cell 6 the replacement path is faster.) The above description is of one preferred embodiment of the invention. Many variations will be apparent to those of ordinary skill in the art. The invention is only limited by the attached Claims.

What is claimed is:

1. A method for use in a packet switching connection oriented network to move a connection between an upstream switch and a downstream switch from an original network path to a replacement network path, comprising the steps of:

a: the upstream switch selecting an arbitrary packet to be a last packet to be transmitted by the downstream switch of those that arrives at said downstream switch via the original path;

b: the upstream switch sending all packets of the connection up to and including said selected packet over the original path and sending all subsequent packets over the replacement path;

c: the upstream switch inserting a marker packet into a cell stream sent over the original path to indicate to the downstream switch the identity of the last data packet arriving from that path;

d: the upstream switch providing the downstream switch a means to identify a first packet after said selected packet to arrive on the replacement path;

e: the downstream switch, transmitting all packets arriving on the original path until the marker packet arrives on the original path, and discarding packets arriving on that original path after that original path marker packet;

f: the downstream switch, buffering any packets, belonging after said selected packet, arriving on the replacement path before the marker packet arrives on the original path; and g: the downstream switch, when the marker packet arrives on the original path, transmitting in an order received, replacement path packets previously buffered, if any, and then transmitting subsequently arriving replacement path packets;

h: whereby the integrity of a packet stream is maintained.

2. The method of claim 1 wherein step d comprises the step of inserting onto the replacement path, another marker packet before said first packet after said selected packet.

3. The method of claim 1 wherein step d comprises the step of sending no packets over the replacement path prior to sending said first packet after said selected packet.

4. The method of claim 1 further comprising the step of the downstream switch discarding any packets arriving on the replacement path before the arrival of packets on the replacement path belonging after said selected packet.

5. The method of claim 1 further comprising the step of:

the upstream switch sends onto the replacement path only packets belonging after said selected packet.

6. The method of claim 1 further comprising the step of:

the upstream switch placing a marker packet into the packet stream sent over the replacement path to indicate the start of subsequent said packets belonging after said selected packet.

7. The method of claim 6 further comprising the step of:

the upstream switch inserting said marker packet into the packet stream sent over the replacement path immediately before the first packet belonging after said selected packet.

8. A method for use in a packet switching connection oriented network to move a connection between an upstream switch and a downstream switch from an original network path to a replacement network path, comprising the steps of:

a: the upstream switch selecting an arbitrary packet to be a last packet to be transmitted by the downstream switch of those that arrives at said downstream switch via the original path;

b: the upstream switch sending all packets of the connection up to and including said selected packet over the original path and sending all subsequent packets over the replacement path;

c: the upstream switch inserting a marker packet into a cell stream sent over the original path to indicate to the downstream switch the identity of the last data packet arriving from that path;

d: the upstream switch providing the downstream switch a means to identify a first packet after said selected packet to arrive on the replacement path;

e: wherein the upstream switch replicates the packet stream, sends a copy along each path, and inserts a marker packet upstream of the point of replication;

f: the downstream switch, transmitting all packets arriving on the original path until the marker packet arrives on the original path, and discarding packets arriving on that original path after that original path marker packet;

g: the downstream switch, buffering any packets, belonging after said selected packet, arriving on the replacement path before the marker packet arrives on the original path; and h: the downstream switch, when the marker packet arrives on the original path, transmitting in an order received, replacement path packets previously buffered, if any, and then transmitting subsequently arriving replacement path packets;

i: whereby the integrity of a packet stream is maintained.

9. The method of claim 8 further comprising the steps of:

reassigning the role of at least one of said upstream and downstream switches to other switches selected to be pivot switches;

wherein the pivot switches selected must bracket all sections of the original and replacement paths where those paths use different links;

wherein said pivot switches act as the upstream and downstream switches of the method.

10. The method of claim 8, wherein the coordination of the steps taken by the upstream and downstream switches is achieved and the application of the method to a reverse flow of packets is coordinated with its application to a forward flow of packets, by the further steps of:

selecting a direction of flow as the direction for initiating coordination actions;

an upstream switch for said selected direction of flow commencing its role as downstream switch for the reverse of said selected direction of flow by monitoring a return direction of flow on both the original and replacement paths;

the upstream switch for said selected direction of flow sending a path switchover message to a downstream switch for said selected direction of flow identifying the connection whose path is to be changed and indicating an incoming port on the downstream switch corresponding to the replacement path;

the downstream switch for said selected direction of flow commencing to monitor the original path and the replacement path for packets and for a marker packet;

the downstream switch for said selected direction of flow commencing steps, in its role as upstream switch for the reverse of said selection direction of flow, dealing with inserting marker packets and the coordinated sending of packets over the original and replacement paths;

the downstream switch for said selected direction of flow sending an acknowledgment message to the upstream switch;

the upstream switch for said selected direction of flow commencing steps of selecting said selected packet and inserting markers, and the coordinated sending of packets over the original and the replacement paths.

* * * * *